(12) United States Patent
Oosthuizen et al.

(10) Patent No.: US 12,036,544 B2
(45) Date of Patent: Jul. 16, 2024

(54) DEVICE FOR HANDLING CATALYST AND OTHER MATERIAL IN A REACTOR VESSEL

(71) Applicant: CATTRACER UK LIMITED, Scunthorpe (GB)

(72) Inventors: Riaan Daniel Oosthuizen, Amanzimtoti (ZA); Jakobus Barnard, Cape Town (ZA); Conan Cole, Cape Town (ZA)

(73) Assignee: CATTRACER UK LIMITED, Scunthorpe (GB)

( * ) Notice: Subject to any disclaimer, the term of this patent is extended or adjusted under 35 U.S.C. 154(b) by 0 days.

(21) Appl. No.: 17/799,582

(22) PCT Filed: Aug. 17, 2020

(86) PCT No.: PCT/IB2020/057739
§ 371 (c)(1),
(2) Date: Aug. 12, 2022

(87) PCT Pub. No.: WO2021/161085
PCT Pub. Date: Aug. 19, 2021

(65) Prior Publication Data
US 2023/0062870 A1 Mar. 2, 2023

(30) Foreign Application Priority Data
Feb. 12, 2020 (ZA) .................. 2020/00893

(51) Int. Cl.
*B01J 8/00* (2006.01)
*B01J 3/00* (2006.01)
*B01J 4/00* (2006.01)

(52) U.S. Cl.
CPC .............. *B01J 8/004* (2013.01); *B01J 3/006* (2013.01); *B01J 4/007* (2013.01); *B01J 8/002* (2013.01);
(Continued)

(58) Field of Classification Search
CPC ... B01J 8/002; B01J 8/003; B01J 8/004; B01J 4/002; B01J 2208/00752;
(Continued)

(56) References Cited

U.S. PATENT DOCUMENTS

2006/0054189 A1* 3/2006 Luke ................... B08B 9/08
134/169 R
2021/0339299 A1* 11/2021 Nicholson .............. B25J 18/025

FOREIGN PATENT DOCUMENTS

EP 1388368 A2 2/2004
EP 3431174 A1 1/2019
(Continued)

OTHER PUBLICATIONS

International Search Report and Written Opinion issued in International Patent Application No. PCT/IB2020/057739 on Oct. 20, 2020.

*Primary Examiner* — Lessanework Seifu
(74) *Attorney, Agent, or Firm* — ArentFox Schiff LLP

(57) ABSTRACT

This invention relates to a robotic device 10.1, 10.2 and method for handling catalyst material 106, 206 in a reactor 100 by removing spent catalyst from the reactor and/or loading the reactor with fresh catalyst without an operator having to enter an interior of the reactor which increases operator safety. The robotic device includes a body 12, which is configured to engage a flange 104 of the reactor, and a handling arm which is configured for use both as a cleaning arm 18 and a loading arm 218. The handling arm is connected to the body and is angularly and longitudinally displaceable relative to the body. The handling arm has a segment which is telescopically extendible/retractable relative to the body. When used as a cleaning arm, the arm receives a vacuum line for removing catalyst. When used as a loading arm, a telescopic loading sleeve is connected to the segment.

15 Claims, 10 Drawing Sheets

(52) U.S. Cl.
CPC .......... *B01J 8/003* (2013.01); *B01J 2204/002* (2013.01); *B01J 2204/005* (2013.01); *B01J 2208/00752* (2013.01); *B01J 2208/00761* (2013.01); *B01J 2208/00769* (2013.01); *B01J 2208/00982* (2013.01); *B01J 2219/242* (2013.01); *B01J 2219/3086* (2013.01); *B01J 2219/3088* (2013.01)

(58) Field of Classification Search
CPC ........ B01J 2208/00761; B01J 2204/002; B01J 2204/005
See application file for complete search history.

(56) References Cited

FOREIGN PATENT DOCUMENTS

| | | | |
|---|---|---|---|
| GB | 2477593 | A | 8/2011 |
| WO | 2020006594 | A1 | 1/2020 |

* cited by examiner

DEVICE FOR HANDLING CATALYST AND OTHER MATERIAL IN A REACTOR VESSEL

CROSS-REFERENCE TO RELATED APPLICATIONS

This application is a 35 U.S.C. § 371 National Phase Application of PCT Application No. PCT/IB2020/057739, filed Aug. 17, 2020, entitled "DEVICE FOR HANDLING CATALYST AND OTHER MATERIAL IN A REACTOR VESSEL," which claims priority to South African Patent Application No. 2020/00893, filed Feb. 12, 2020. The disclosures of these prior applications are hereby incorporated by reference herein in their entirety.

FIELD OF THE INVENTION

This invention relates to a robotic device for handling catalyst material in a reactor. In particular, the invention relates to a robotic device for removing spent catalyst material from an interior of a reactor and for loading new catalyst material to the interior of the reactor. The invention extends to a method of removing catalyst material from a reactor using the robotic device. The invention also extends to a method of loading catalyst material to a reactor using the robotic device.

BACKGROUND

Catalyst material is typically used inside reactors to increase the rate of a chemical reaction. Conventional catalyst loading methods include sock loading and dense loading.

The sock loading method involves transferring catalyst material from a loading hopper at the top of the reactor into a catalyst bed, via a manway at the top of the reactor using a partly flexible loading sleeve or sock which typically consists of a rigid/semi-rigid pipe attached to a discharge outlet of the hopper at the top and a flexible sock connected to a lower end of the rigid pipe. An operator is normally required inside the reactor to direct the flexible sock to ensure even distribution of the catalyst material inside the reactor. Accordingly, the sock loading method typically requires reactor entry by the operator and, once inside, manual intervention by the operator.

In order to prevent damage to the catalyst, a maximum distance between a distal or discharge end of the flexible sock and a top surface of the catalyst bed should preferably be less than 1 meter. Furthermore, as operation continues, it is important to ensure that a maximum drop of 1 m at the bottom of the flexible sock is maintained in order to avoid or minimise freefall of catalyst material which causes abrasion and dust formation.

It will be appreciated that during the loading process, the catalyst bed rises inside the reactor vessel which necessitates lifting or shortening of the rigid pipe of the loading sock. This is usually achieved by manually cutting a section of the lower end of the rigid pipe off by hand which necessitates prior disconnection and post-cutting reconnection of the flexible loading sock. It will be appreciated that this is a time-consuming, laborious task. In addition, the cut sections (approximately 1 m lengths) need to be removed from the reactor during the loading process. For the sake of operator safety, the flexible part of the loading sock should not be longer than 5 m. If it is longer than 5 m, it poses a safety risk to the operator because in the event that it disconnects from the rigid pipe, it could cause serious or even fatal injury to the operator standing on the catalyst bed below, should it fall on the operator.

The dense loading method involves using a device operatively fixed or mounted inside the reactor to spread or distribute the catalyst material evenly or uniformly inside the reactor thus reducing void formation and bridging between catalyst particles. The device should spread the catalyst evenly over the surface of the catalyst bed whilst minimising it hitting side walls of the reactor. Accordingly, a drawback associated with dense loading is that it requires constant operator attention to regulate the feed rate (including regulating revolutions per minute of the spreader or distributer in order to ensure even distribution as the catalyst bed level rises) and avoid surges. Since the catalyst bed is denser, more catalyst material can be loaded into the same reactor volume using this method. Dense loading can also reduce channelling where poor or segregated packing allows preferential flow through part of the reactor. It normally requires an operator in the reactor to follow loading. Also, periodic checking of the level and evenness is required during loading.

Following chemical reactions, spent catalyst material needs to be removed from the reactor vessel. Conventional methods to remove such material typically require trained operators to enter an interior of the reactor through the manway at the top of the reactor and to manually remove the spent catalyst material from the interior of the reactor.

A common by-product of chemical reactions is the accumulation of pyrophoric material inside the reactor with the spent catalyst. Pyrophoric material spontaneously combusts when exposed to oxygen which can lead to a fire or an explosion. Significant measures to create inert conditions inside the reactor to prevent combustion of pyrophoric material is therefore necessary before an operator can enter the reactor to manually remove spent catalyst. Inert conditions are typically achieved via a constant nitrogen purge through the reactor. In order to remove spent catalyst material using conventional methods, operators are equipped with life support systems, such as breathing apparatus, before entering the reactor vessel in order to survive in the inert conditions created inside the reactor.

Manual removal of spent catalyst material by operators is dangerous and has led to a number of fatalities resulting from engulfment, asphyxiation, dust explosion and fire, exposure to heat and falling from heights.

Conventional catalyst handling methods, including methods for the removal and loading of catalyst material, typically involves reactor entry by an operator. Reactor entry by an operator is undesirable due to the associated risk to the health and safety of the operator.

There is therefore a need for a robotic device for removing catalyst material from a reactor and for loading catalyst material into the reactor which can operate automatically, or which can be remotely controlled by an operator, such that the need for operators to enter the reactor during the catalyst removal and catalyst loading process, is obviated and operator involvement during the above processes is limited. By obviating the need for operators to enter the reactor, the risk of operator death or injury is significantly reduced. The risk of catalyst breakage caused by an operator walking on the catalyst bed is also eliminated by obviating the need for operators to enter the reactor. The invention described below aims to provide such a device.

SUMMARY OF THE INVENTION

In accordance with a first aspect of the invention, there is provided a robotic device for handling catalyst material in an interior of a reactor, wherein the robotic device comprises:

a body configured to engage a flange of the reactor, wherein an inner edge of the flange defines an opening in the reactor; and a handling arm connected to the body and having a free end, the handling arm comprising at least one segment which is telescopically extendible/retractable relative to the body, wherein at least a part of the handling arm including the free end is configured to extend through the opening in the reactor into the interior of the reactor, and wherein the handling arm is configured to receive or connect to a vacuum line to form a cleaning arm for removing catalyst material from the interior of the reactor such that the free end of the handling arm and an inlet end of the vacuum line are proximate each other.

The body may include a base plate which is configured to engage the flange of the reactor and a head which is articulated to the base plate for rotation relative to the base plate about a rotation axis. The handling arm may be in the form of a multistage telescopic handling arm which comprises a frame assembly which defines a central passageway along its length which is configured to receive or connect to the vacuum line to form the cleaning arm. The head of the body may define a longitudinally extending receiving channel therein, the handling arm being connected to the head of the body and being longitudinally displaceable or movable relative to the head of the body within the receiving channel.

The base plate of the body may be provided with a plurality of holes therethrough, positioning of the holes corresponding with or being in register with holes provided through the flange of the reactor such that the base plate of the body can be secured to the flange by means of fasteners. The head of the body may be configured to rotate about the rotation axis relative to the base plate of the body.

The handling arm may take the form of a multi-segmented, articulated cleaning arm which includes a first, multistage telescopic segment which is displaceably connected to the head of the body and which is removably connected by way of a pivot joint to a second segment which, in turn, is removably connected by way of another pivot joint to a third segment.

The head of the body may be connected to the base plate by way of a swivel joint such that the head is angularly displaceable relative to the base plate about the rotation axis.

The multistage telescopic handling arm may include a segment which comprises a plurality of interconnected extensions which are telescopically extendable/retractable relative to one another.

Telescopic displacement of the multistage telescopic handling arm may be achieved by means of a winch system. A winch cable may be secured to an innermost telescopic extension of the segment such that telescopic extension of the extensions is achieved by winding down or out the winch cable, which allows the extensions to be lowered into the interior of the reactor under the pull of gravity, and telescopic retraction is achieved by raising the innermost telescopic extension by winding up the winch cable.

The handling arm may be configured as a loading arm by connecting a telescopically extendable/retractable loading sleeve to individual telescopic extensions of the telescopic segment of the handling arm to form the loading arm for loading catalyst material into the interior of the reactor. The free end of the handling arm and an outlet of the loading sleeve may be proximate each other.

The loading sleeve may include telescopically extendable/retractable sections each of which is internally secured to an individual corresponding extension of the segment of the loading arm such that the loading sleeve is concentrically received within the segment of the loading arm, and such that the loading sleeve is telescopically displaceable, in inside out fashion relative to the segment, in unison within the segment of the loading arm. A revolving material distributor may be secured to the free end of the loading arm, in fluid flow communication with a lowermost section of the loading sleeve.

An operatively upper end of each respective section of the loading sleeve may be secured to the corresponding extension of the segment of the loading arm. The loading sleeve may therefore form an internal passageway for conveying the catalyst material from an inlet to the revolving material distributor.

An operatively lower end of each section of the loading sleeve may include a flow restriction or flow reducer which serves to impede the flow of catalyst material through the internal passageway such that the loading sleeve has multistage internal flow restriction along the internal passageway between the inlet and the revolving material distributor. The flow restrictions may be conical and alternate between a depending cone and an inverted or upwardly orientated cone.

The robotic device may be remotely controlled by an operator from a remote control station and may include at least one camera which is mounted to the handling arm for feeding video footage to the remote control station.

The invention extends to a method for removing catalyst material from an interior of a reactor using the robotic device as described above, the method comprising:

connecting the vacuum line to the handling arm of the robotic device to form the cleaning arm;

connecting a second and a third segment to the cleaning arm such that the second segment articulates with the at least one segment and the third segment articulates with the second segment;

positioning the robotic device on the flange of the reactor such that at least part of the cleaning arm including the free end extend through the opening in the reactor into the interior of the reactor;

securing the body of the robotic device to the flange of the reactor by means of fasteners; and removing the catalyst material by vacuum from the interior of the reactor by telescopically extending the cleaning arm of the robotic device by way of remote control.

The invention also extends to a method for loading catalyst material to an interior of a reactor using the robotic device as described above, the method comprising:

connecting the loading sleeve to the segment of the handling arm of the robotic device to form the loading arm;

connecting a revolving material distributor to the free end of the loading arm;

positioning the robotic device on the flange of the reactor such that at least part of the loading arm including the revolving material distributor extend through the opening in the reactor into the interior of the reactor;

securing the body of the robotic device to the flange of the reactor by means of fasteners; and loading the catalyst material using the robotic device by directing flow of catalyst material through the loading sleeve and progressively telescopically retracting the loading arm as a level of catalyst inside the reactor rises.

The handling arm may comprise a frame assembly. The frame assembly may be configured to receive or connect to either the vacuum line to form the cleaning arm or to receive or connect to the loading sleeve to form the loading arm.

The opening defined by the flange of the reactor may be an entry manway. In particular, the opening may be located at an operative top of the reactor.

The body may be in the form of a pedestal.

The body may define a longitudinally extending receiving channel therein. The channel may be provided along a generally vertical axis passing through the body. The handling arm may be received in the channel of the body such that the handling arm is longitudinally displaceable or movable relative to the body within the receiving channel.

The body may be provided with a plurality of slotted holes therethrough configured to universally fit multiple reactor types and designs, wherein each hole is configured to receive a fastener. The positioning of the slotted holes through the body may correspond with the positioning of holes provided through the flange of the reactor such that the body can be secured to the flange by means of fasteners, such as bolts. In particular, the holes through the body may be provided on a base plate of the body such that the base plate of the body is configured to be secured to the flange of the reactor by means of fasteners.

The holes through the body may be configured to universally fit multiple reactor types and reactor designs.

The body may be configured to include a seal or seat element such that, in use, the seat element engages the flange of the reactor and supports the body on the flange of the reactor which may substantially, or at least partially, seal the opening of the reactor thereby protecting the reactor interior from atmospheric elements.

The seat element may be connected or connectable to the base plate of the body such that the seat element is sandwiched between the base plate of the body and the flange of the reactor when the body is secured to the flange of the reactor.

The seat element may have a shape complementary to the flange of the reactor. In particular, the seat element may be in the form of an annular ring. The seat element may be in the form of an annular gasket which corresponds to the manway flange dimensions. The seat element may have holes therethrough which corresponds with the holes in the body, wherein each hole is configured to receive a fastener. The seat element may typically be constructed from rubber, Teflon or any other suitable material.

The seat element may provide a protective surface between the body and the flange of the reactor during use.

Securing of the body to the flange of the reactor may stabilize the body relative to the reactor sufficiently such that the need for additional stabilizing means during use of the robotic device is obviated. In particular, stabilizing arms, to grip an inner surface of the reactor during use of the robotic device, are not necessary.

The handling arm may be configured to rotate in a horizontal plane about a generally vertical axis passing through the body. Accordingly, the handling arm may be angularly displaceable relative to the body about a swivel joint which connects the handling arm to the body.

Preferably, the body may be configured to rotate in a horizontal plane about the generally vertical axis, whereby the rotation of the body propels the handling arm connected to the body to rotate in a horizontal plane about the generally vertical axis.

As described herein, the handling arm may be configured to form a cleaning arm for removing catalyst material from the interior of the reactor by receiving or connecting to the vacuum line. Preferably, a second and third segment may be connected to the handling arm to form the cleaning arm.

The cleaning arm may, therefore, comprise at least three segments, such that a first segment is connected to the body, the second segment is connected to the first segment and the third segment is connected to the second segment.

Each segment of the cleaning arm may be removably connected to an adjacent segment. In particular, the second segment may be removably connected to the first segment and the third segment may be removably connected to the second segment.

The cleaning arm may comprise multiple segments, wherein at least one segment is telescopically extendible and/or retractable relative to the body. In particular, the first segment, which is connected to the body, may be telescopically extendible and/or retractable relative to the body.

In use, the cleaning arm may be moved in the receiving channel towards the catalyst material in the interior of the reactor such that the free end of the cleaning arm is embedded in the catalyst material inside the interior of the reactor.

Each segment of the cleaning arm may be removably connected to an adjacent segment by means of a hinge or pivot joint. In particular, the second segment may be removably connected to the first segment by means of a hinge or pivot joint and the third segment may be removably connected to the second segment by means of a hinge or pivot joint. Each hinge joint may be independently controlled to change the angle between adjacent segments such that the cleaning arm is configured to be moveable from a first inoperative condition, in which the segments of the cleaning arm are arranged to be aligned along the generally vertical axis relative to the body, to a second position, wherein at least one segment of the cleaning arm extends at an angle from the generally vertical axis relative to the body.

At least one segment of the cleaning arm may comprise a plurality of interconnected extensions, wherein these extensions may be telescopically extendible and retractable/contractable relative to one another.

When the handling arm is converted to be the cleaning arm, the at least one segment comprising telescopically extendible and retractable/contractable extensions may be the first segment, which is connected to the body.

The robotic device may be connected/connectable to a pneumatic power source configured to drive telescopic displacement in the form of extension or retraction/contractions of the extensions of the at least one segment of the cleaning arm.

Each segment of the cleaning arm may be telescopically extendible and telescopically retractable as described above. Preferably, the first segment may be telescopically extendible and telescopically retractable as described above.

Each segment of the cleaning arm may be independently controlled to adjust the length of the segment telescopically. In use, the length of a segment may be telescopically increased such that the free end of the cleaning arm is embedded in the catalyst material inside the interior of the reactor.

The vacuum line may be mounted or mountable to the frame assembly of the handling arm to form the cleaning arm. Preferably, the frame assembly of the handling arm may define a central passageway along its length to receive at least a portion of the vacuum line. The frame assembly may include or define a nozzle at the free end of the cleaning arm, wherein the nozzle is configured to connect to the inlet end of the vacuum line.

The vacuum line may be connected or connectable to an external vacuum source. The vacuum source may be mobile.

The frame assembly of the handling arm may be configured to support at least one camera. The frame assembly may be configured to support a plurality of cameras.

As described herein, the handling arm may be configured to form a loading arm for loading catalyst material into the interior of the reactor by receiving or connecting to a loading sleeve. The loading arm may comprise a single segment which is telescopically extendible and/or retractable relative to the body.

In order to convert the cleaning arm to the loading arm, the second and third segments of the cleaning arm may be removed such that only the first segment, which is connected to the body, remains. The vacuum line, and ancillary equipment such as a vacuum reel, may be removed from the cleaning arm such that the loading arm can receive or be connected to the loading sleeve.

In use, the loading arm may be moved in the receiving channel of the body towards a floor of the reactor.

The first segment of the loading arm may comprise a plurality of interconnected extensions, wherein these extensions may be telescopically extendible and retractable/contractable relative to one another.

Telescopic displacement of the loading arm may be achieved by means of a pneumatic power source configured to drive telescopic displacement or by means of a winch system, wherein a winch cable is secured to an innermost telescopic extension of the segment of the loading arm, as described herein.

The loading sleeve may be mounted or mountable to the frame assembly of the handling arm to form the loading arm. Preferably, the frame assembly of the handling arm may define a central passageway along its length to receive at least a portion of the loading sleeve.

It is preferred that the central passageway is configured to receive at least a portion of the vacuum line when the handling arm is to be used as the cleaning arm and wherein the central passageway is also configured to receive at least a portion of the loading sleeve when the handling arm is to be used as a loading arm.

The frame assembly may be configured to be connected to a conventional loading device. The frame assembly may be configured to define or be configured to be connected to an attachment to which a conventional loading device can be mounted. Preferably, the attachment to which a conventional loading device can be mounted is proximate the free end of the handling arm.

The frame assembly of the handling arm, when configured to form the loading arm, may be configured to support at least one camera. Preferably, the at least one camera may be supported proximate the free end of the handling arm.

In use, an inlet of the loading sleeve may protrude operatively above the body of the robotic device. The inlet of the loading sleeve may be cone-shaped to receive catalyst material. The inlet of the loading sleeve may be covered with a mesh screen to prevent foreign debris to enter the loading sleeve. The inlet may be positioned below a catalyst loading hopper.

The loading sleeve may be resiliently deformable.

At least a portion of the loading sleeve may be configured such that it is telescopically extendible and retractable/contractable in unison with the loading arm.

At the start of the loading process, the interconnected extensions of the first segment of the loading arm and the loading sleeve connected to the loading arm may be fully extended such that the outlet of the loading sleeve is proximate an internal floor of the reactor, preferably about 1 meter from the floor of the reactor, even more preferably less than 1 meter from the floor of the reactor. As the level of the catalyst bed rises, the interconnected extensions of the first segment and the loading sleeve may be telescopically retracted/contracted to ensure that the outlet of the loading sleeve remains within an acceptable distance of the catalyst bed level, typically within 1 meter. The loading arm and the loading sleeve may be continuously retracted/contracted as the level of the catalyst bed rises.

In particular, the loading sleeve may define an internal passageway between the inlet and the outlet to direct the flow of catalyst material. A portion of the passageway may incorporate a series of resiliently deformable constrictions to impede flow of catalyst material through the passageway. It will be appreciated that the constrictions would prevent freefall of catalyst material, by means of gravity, through the passageway from the inlet to the outlet which may result in structural damage to the catalyst material. It will also be appreciated that the constrictions create regions inside the passageway which are not fully filled with catalyst material during the loading process and which enables the loading sleeve to contract in unison with the loading arm.

The robotic device for loading catalyst material to an interior of a reactor may be configured to be connected to a vacuum unit or a dust extraction unit during catalyst loading to control dust formation during the loading process.

The robotic device as herein described may be connected to a power source. The robotic device may be configured to operate automatically or by an operator via remote control. The operator may operate the robotic device from a remote-control station located away from the reactor.

In accordance with conventional methods, nitrogen ($N_2$) gas may be used to create and to maintain a positive inert atmosphere by continuously purging the reactor with a constant flow of $N_2$ gas to prevent any oxygen ($O_2$) from entering the reactor interior, and to maintain an atmosphere where the $O_2$ concentration remains below a certain threshold, typically at or below 2 volume/volume %. The $N_2$ gas may act as a barrier or blanket over the catalyst material and may displace air or hydrocarbons that may be trapped or accumulated inside the reactor which may cause an explosion or fire.

The present invention may be configured to accommodate the abovementioned method of creating and maintaining a positive inert atmosphere in the reactor interior in the following ways:

The body may be provided with a $N_2$ gas return line inlet to re-direct any of the $N_2$ gas which may have been removed from the reactor interior during the vacuuming process into the interior of the reactor.

A fresh $N_2$ inlet may be provided on the body which is connected to a $N_2$ source by means of a fresh $N_2$ line.

A pressure relief valve (PRV) connection point may be provided on the body. In the event that pressure inside the reactor exceeds a predetermined threshold pressure, a rupture disc in the PRV will fail and relieve pressure on the reactor shell.

Connecting of the vacuum line to the handling arm of the robotic device may involve threading the vacuum line through the passageway defined by the frame assembly of the handling arm and connecting an inlet end of the vacuum line to the nozzle defined or included at the free end of the handling arm.

The method may further include an initial step of connecting the second and third segments, as described herein, to the handling arm to form the cleaning arm.

The method may further include longitudinally moving or displacing the cleaning arm relative to the body, in the receiving channel of the body, to position the free end of the cleaning arm relative to the catalyst material inside the interior of the reactor.

The method may further include adjusting the length of at least one segment of the cleaning arm telescopically to ensure that the free end of the cleaning arm is embedded in the catalyst material during use.

The method may further include independently adjusting the hinge or pivot joint connecting adjacent segments of the cleaning arm to adjust the angle between adjacent segments of the cleaning arm.

The method may further include purging an interior of the reactor using an inert gas whilst vacuuming to maintain inert conditions. The gas may be $N_2$ gas.

Connecting the loading sleeve to the handling arm of the robotic device may involve threading the loading sleeve through the passageway defined by the frame assembly of the handling arm and connecting the outlet of the loading sleeve to a conventional loading device.

The method may further include a step of positioning a catalyst loading hopper operatively above the inlet of the loading sleeve to allow the loading sleeve to receive catalyst material from the catalyst feeder hopper by means of gravity.

The method may further include longitudinally moving or displacing the loading arm relative to the body, in the receiving channel of the body, to position the free end of the loading arm relative to the catalyst material inside the interior of the reactor.

The method may further include adjusting the length of the at least one segment of the loading arm and the length of the loading sleeve telescopically and in unison to ensure that the free end of the loading arm is proximate an internal floor of the reactor at the start of the loading process. Preferably, the at least one segment of the loading arm and the length of the loading sleeve may be telescopically extended such that the free end of the loading arm is at least about 1 meter from the floor of the reactor at the start of the loading process, even more preferably such that the free end of the handling arm is less than 1 meter from the floor of the reactor at the start of the loading process.

The method may further include telescopically retracting/contracting the interconnected extensions of the at least one segment of the loading arm and the loading sleeve in unison as the bed of the catalyst rises in the reactor interior during the loading process. The interconnected extensions of the at least one segment of the loading arm and the loading sleeve may be continuously retracted/contracted during the loading process to ensure that the free end of the loading arm and the outlet of the loading sleeve remain about 1 meter from the level of the catalyst bed, preferably such that the free end of the loading arm and the outlet of the loading sleeve remain less than 1 meter from the level of the catalyst bed.

As described herein, the handling arm of the robotic device may either be converted to a cleaning arm when the device is to be used for removing catalyst material from an interior of a reactor, or to a loading arm when the device is to be used for loading catalyst material to an interior of a reactor. The term "handling arm" therefore refers to the term "cleaning arm" when used in the context of the catalyst removal process and vice versa, i.e. the term "cleaning arm" refers to the term "handling arm" in the same context. The term "handling arm" refers to the term "loading arm" when used in the context of the catalyst loading process and vice versa, i.e. the term "loading arm" refers to the term "handling arm" in the same context.

Although the above description specifically refers to the handling of catalyst material in the interior of the reactor, it will be appreciated that other material present in the reactor may also be removed and/or loaded by the device in accordance with the invention in a similar fashion. The term "catalyst material" should therefore be interpreted to include other material, including loose solids, adsorbents, coke, char, etc.

BRIEF DESCRIPTION OF DRAWINGS

The invention will now be described, by way of example, with reference to the accompanying diagrammatic drawings in which.

DETAILED DESCRIPTION OF AN EXAMPLE EMBODIMENT

Figure 1:
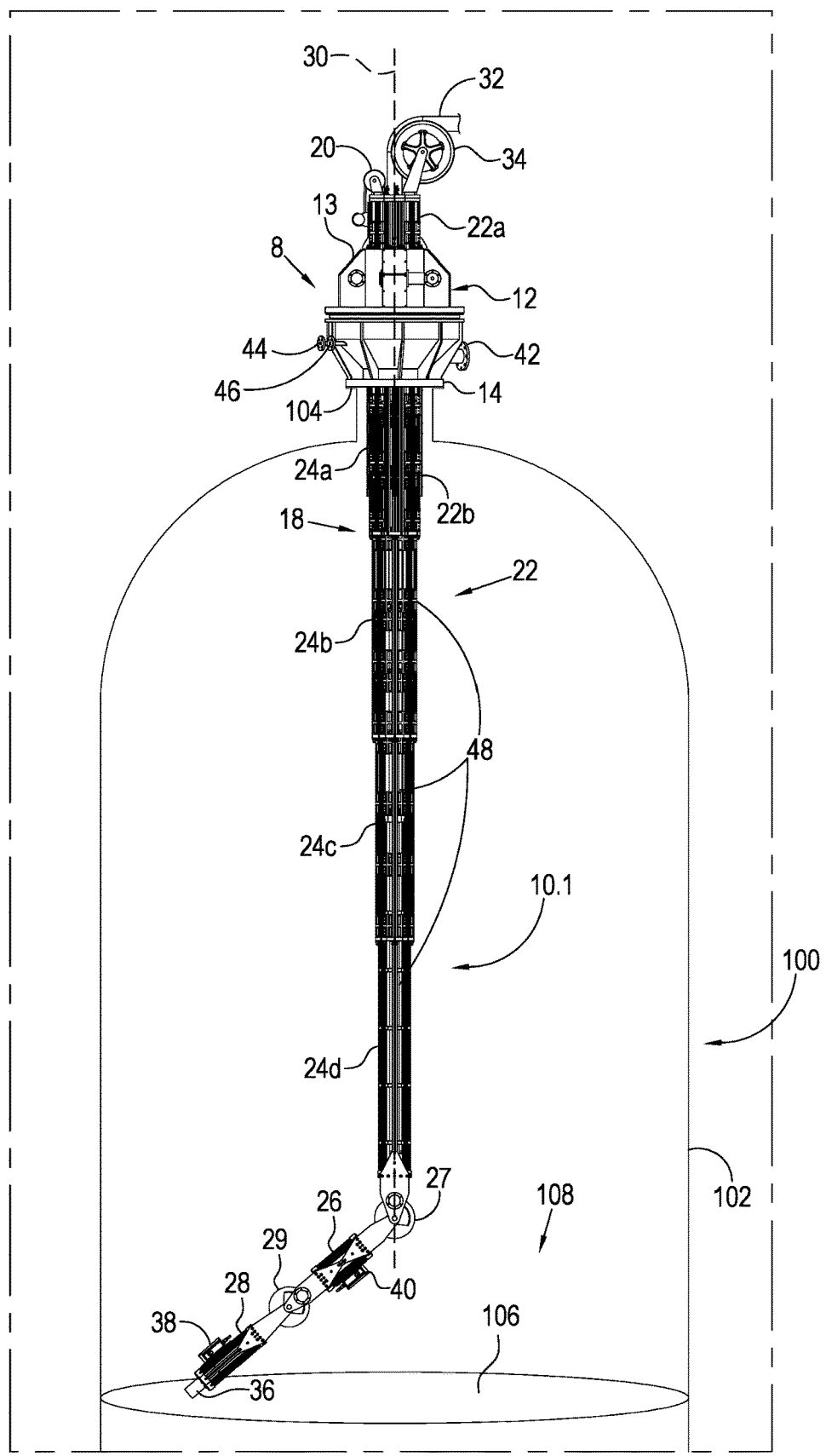
FIG. 1 shows a schematic vertical section of the robotic device in accordance with the invention used in a reactor for the removal of catalyst material from an interior of the reactor, in an extended condition, including a vacuum line connected to the handling arm of the device to form the cleaning arm.

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances and are a part of the present invention. Thus, the following description is provided as illustrative of the principles of the present invention and not a limitation thereof.

In the Figures, reference numerals 10.1, 10.2 refer generally to the robotic device, in accordance with the invention, for handling catalyst material in an interior of a reactor. The robotic device 10.1, 10.2 has dual purposes and, accordingly, is configured to be used, both, for removing spent catalyst or other material from the reactor, and for loading catalyst material into the reactor. In FIGS. 1, 2, 5 and 6 a typical reactor vessel 100 is shown. The reactor vessel 100 comprises an outer shell 102, enclosing or defining a reactor interior 108, and an entry manway at the operative top of the reactor vessel 100, the entry manway having a flange 104. Inside the reactor vessel 100 is either spent catalyst material 106 (see FIGS. 1 and 2) or newly loaded catalyst material 206 (see FIGS. 5 and 6).

Removing Spent Catalyst Material from the Interior of the Reactor

In FIGS. 1 to 4, the robotic device 10.1 is used to remove spent catalyst material 106 from the reactor vessel 100 by vacuum.

To this end, in order to facilitate removal of spent catalyst, the robotic device 10.1 is mounted to the reactor vessel 100 such that it is rotatable relative to the reactor vessel 100 and is moveable inside the reactor vessel 100. The robotic device 10.1 is operated remotely by an operator from a remote control station (not shown) situated away from the reactor vessel 100. In this way, the need for the operator to enter the reactor interior 108 is obviated. The remote control station is connected to the robotic device 10.1 by means of cables (not shown). The remote control station has one or more monitors for viewing images from video cameras 38, 40 and is provided with controls to extend, retract, rotate and adjust the angle of the robotic device 10.1 relative to the catalyst material 106 inside the reactor vessel 100.

The robotic device 10.1, 10.2 has a body 12 in the form of a pedestal configured to support the robotic device on the entry manway flange 104. The body 12 comprises an annular base plate 14 which is configured to support the robotic device on the entry manway flange 104 and a head 13 which is articulated to the base plate 14 for rotation about a vertical rotation axis 30. The annular base plate 14 of the body 12 is provided with a plurality of holes 16, which can be seen in FIGS. 2 and 4. The holes 16 correspond with bolt openings (not shown) provided in the entry manway flange 104, to allow the base plate 14 to be securely connected to the entry manway flange 104 by means of bolts and nuts or other suitable fasteners. In doing so, the body 12 is sufficiently stabilized relative to the reactor vessel 100.

Dimensions of the base plate 14 are designed to fit the most common reactor entry manway size which is 600 mm inside diameter. However, some newer design reactors have larger entry manways with inside diameters of 750 mm and 900 mm, respectively. In such cases a spacer flange (not shown) can be bolted on to the base plate 14 to allow for a larger footprint to engage the larger entry manway.

In order to extract the spent catalyst material 106 or to load fresh catalyst material 206, the robotic device 10.1, 10.2 includes a handling arm which is connected to the head 13 of the body 12. In the embodiment of the robotic device 10.1 illustrated in FIGS. 1 to 4, the handling arm takes the form of a cleaning arm 18 for removing catalyst material 106 from the interior 108 of the reactor vessel 100. This is achieved by connecting a flexible vacuum line 32 (see FIGS. 1 to 3) to the cleaning arm 18 by threading the vacuum line 32 through an internal passage of the cleaning arm 18. In addition, to provide for increased manoeuvrability, additional cleaning segments 26 and 28 are pivotally connected to a distal end of a first segment 22 of the cleaning arm 18.

Accordingly, the cleaning arm 18 as shown in FIGS. 1 to 4 comprises three segments 22, 26, 28. The first segment 22 is connected to the body 12. A second segment 26 is removably and pivotally connected to a distal end of the first segment 22 by a hinge joint 27. A third segment 28 is removably and pivotally connected to a distal end of the second segment 26 by another hinge joint 29.

Accordingly, in this embodiment 10.1 of the robotic device, the cleaning arm 18 is multi-segmented and articulated comprising the various segments 22, 26, 28. It can be seen from FIG. 1 that the cleaning arm 18 extends through the body 12 such that, in use, a portion of the first segment 22 of the cleaning arm 18 indicated as segment 22a is located outside the reactor vessel 100 above the body 12, whilst a remaining portion of the first segment 22, indicated as segment 22b, together with segments 26, 28 of the cleaning arm 18 extend into the reactor interior 108.

The cleaning arm 18 is longitudinally movable or displaceable relative to the body 12 in an operational upward or downward direction by way of multiple motor-driven rack and pinion arrangements 19. As the cleaning arm 18 moves upwards or downwards relative to the body 12, the lengths of inner and outer segments 22a, 22b are adjusted accordingly.

The robotic device 10.1 can be connected to a cable of a crane (not shown) via a lifting cable reel 20. During installation, the crane is used to position the body 12 on top of the entry manway flange 104 such that a portion of the cleaning arm 18 extends through an opening defined by the entry manway flange 104.

Initially, when the robotic device 10.1 is being positioned by the crane, the different segments 22, 26, 28 of the cleaning arm 18 must be aligned along a generally vertical axis 30 of the body 12 in order for segments 22b, 26, 28 of the cleaning arm 18 to be raised and/or lowered through the opening defined by the entry manway flange 104 without being damaged.

Once in position, the body 12 is bolted to the entry manway flange 104. The robotic device 10.1 is then connected to the remote control station by means of cables, including power supply cables and video camera cables, thereby rendering the robotic device 10.1 operational.

Figure 2:
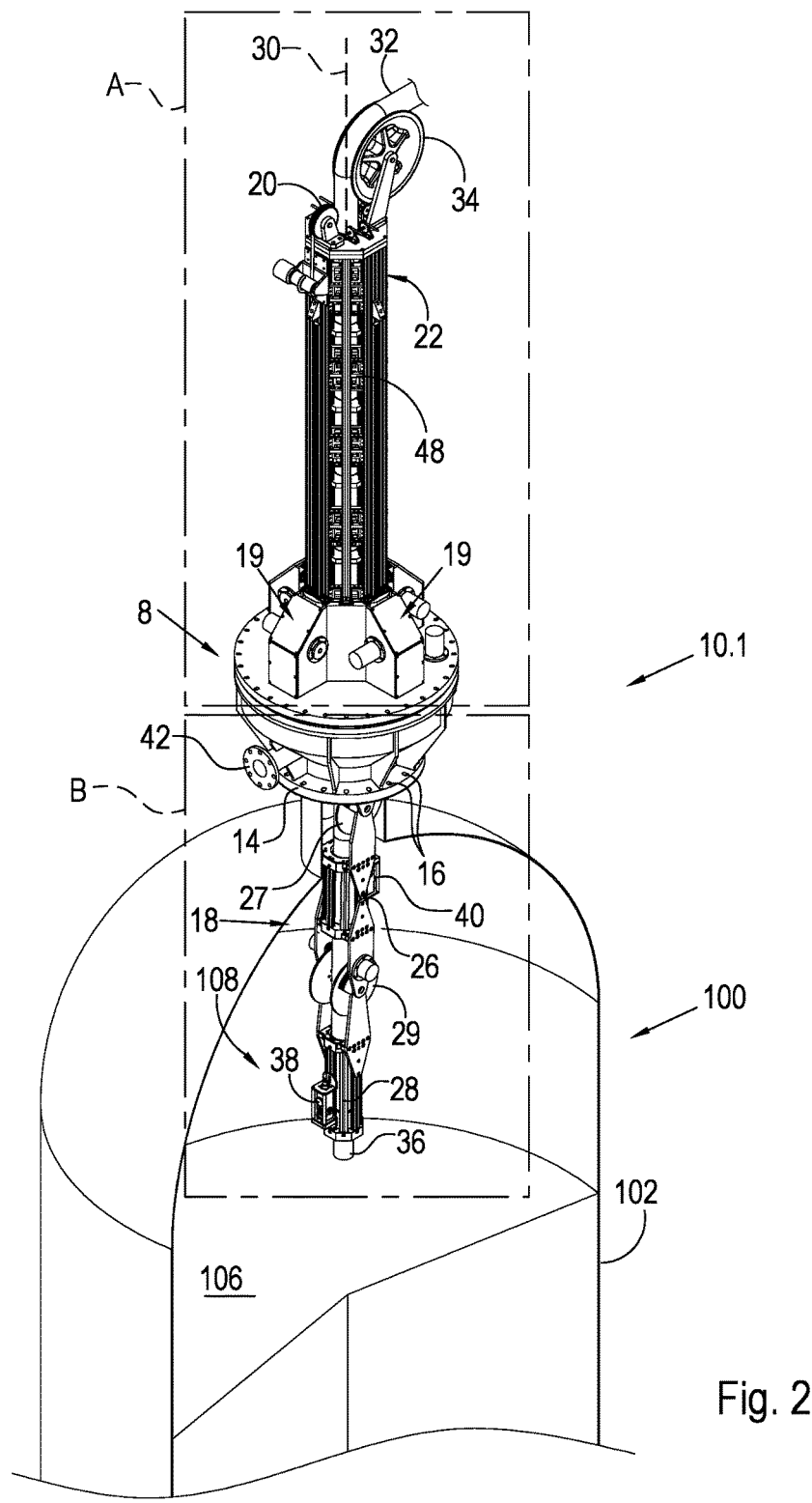
FIG. 2 shows a three-dimensional vertical section of the robotic device shown in FIG. 1, in a contracted condition, used in a reactor, including a vacuum line connected to the cleaning arm.
Figure 3:
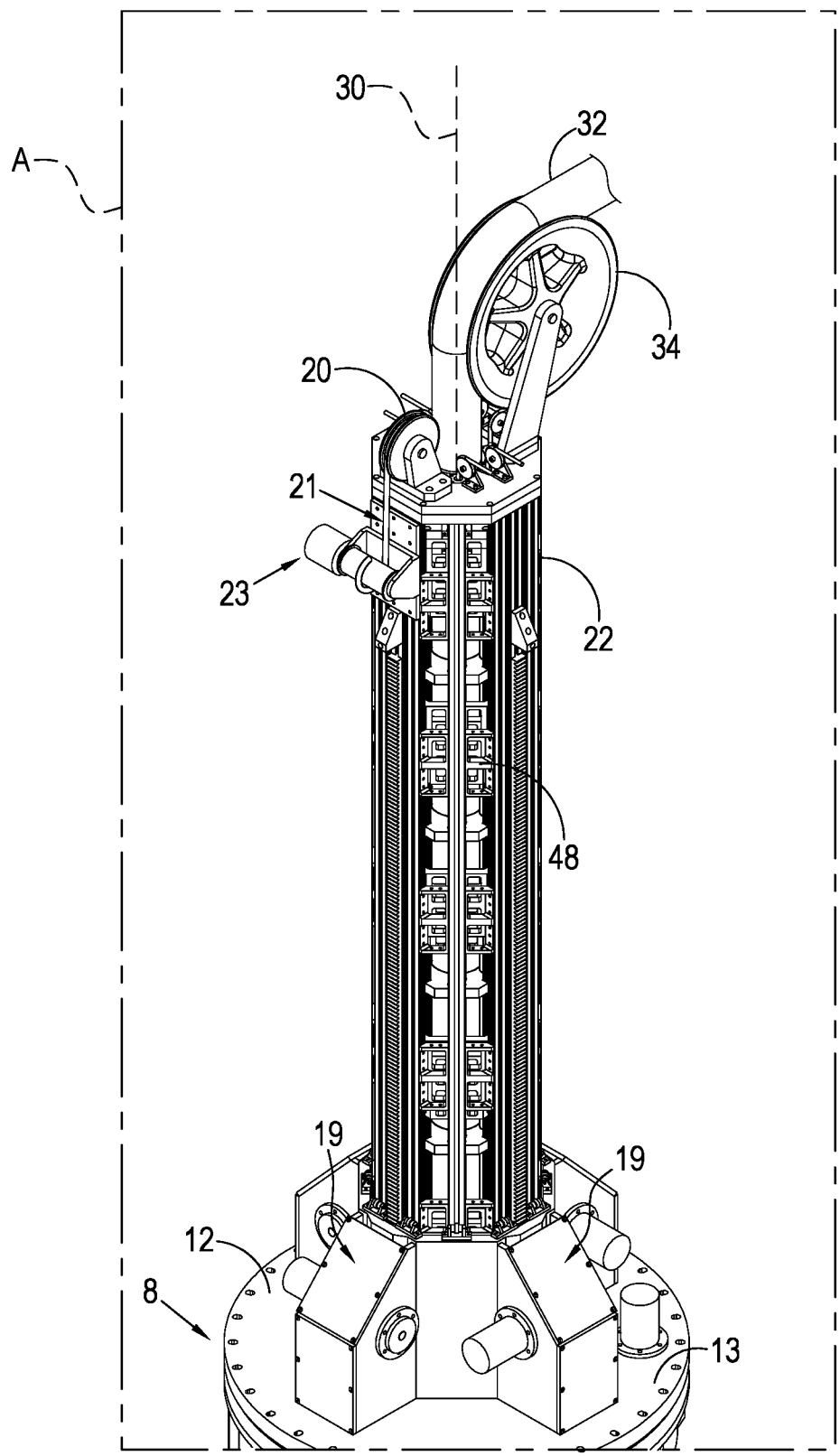
FIG. 3 shows an enlarged three-dimensional view of Detail A indicated in FIG. 2.
Figure 4:
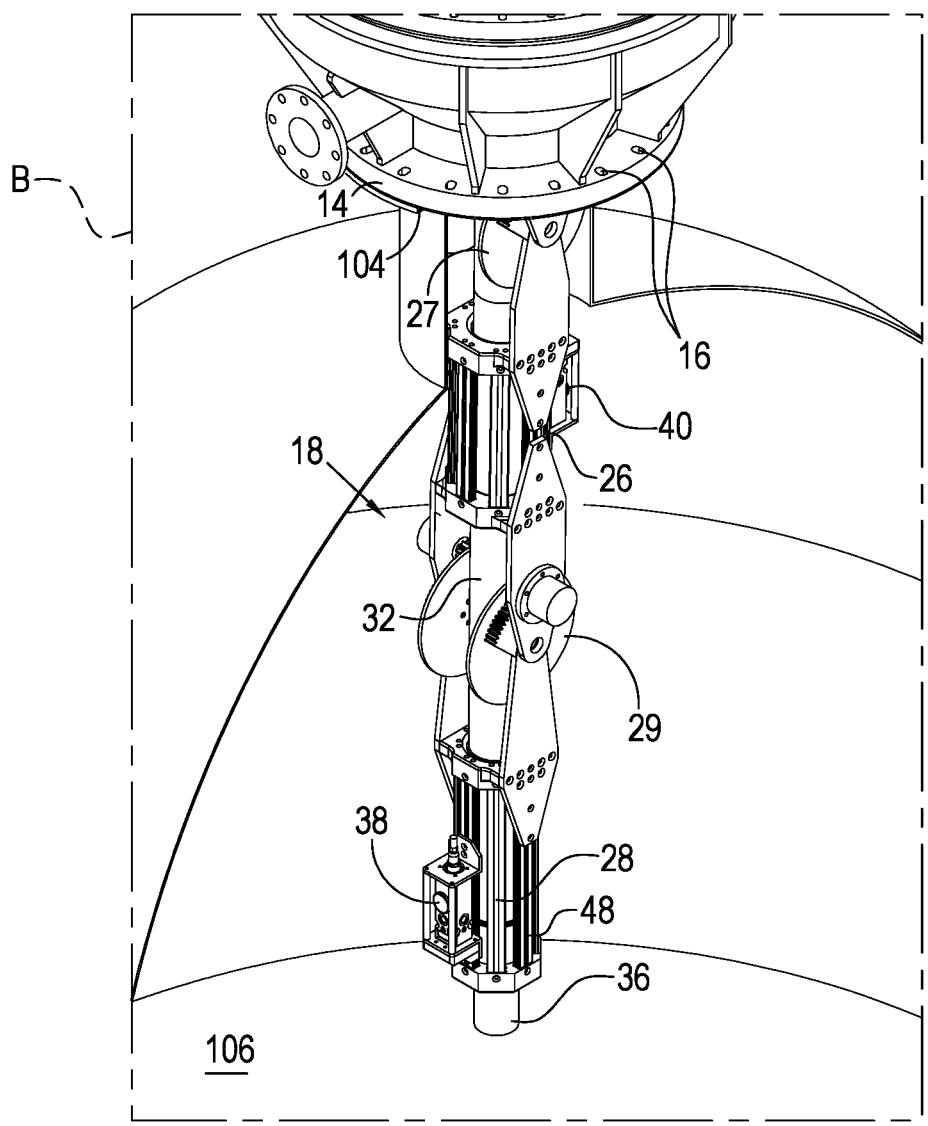
FIG. 4 shows an enlarged three-dimensional view of Detail B indicated in FIG. 2.

During operation of the robotic device 10.1, the first segment 22 of the cleaning arm 18 is extended and retracted/contracted in telescopic fashion. In FIG. 1, it can be seen that the first segment 22 comprises four telescopic extensions 24a, 24b, 24c, 24d. In FIG. 1, these extensions 24a, 24b, 24c, 24d are shown in a telescopically extended condition such that all four extensions 24a, 24b, 24c, 24d are visible. In FIG. 2, extensions 24a, 24b, 24c, 24d are in a contracted condition.

To clean the reactor interior 108, a connection angle of each hinge or pivot joint 27, 29 is adjustable. As shown in FIG. 1, the hinge joints 27, 29 may be remotely adjusted or controlled to allow segments 26 and 28 to be angled relative to the generally vertical axis 30 in order to reach catalyst material 106 distributed towards a side wall of the outer shell 102 of the reactor vessel 100. Each hinge joint 27, 29 can be controlled independently by way of a motor driving a gear.

The head 13 of the body 12 is connected to the base plate 14 by way of a swivel joint 8 which is configured to rotate in a horizontal plane about the generally vertical axis 30 in a clockwise and/or anti-clockwise fashion. An electrical motor situated inside the body 12 is drivingly connected to a horizontal ring gear such that when the motor is actuated, the ring gear is angularly displaced about the vertical axis 30. In rotating the body 12, the cleaning arm 18, which is connected to the swivel joint 8 of the body 12, is propelled to also rotate in a horizontal plane about the generally vertical axis 30.

A vacuum source (not shown) is provided exterior to the reactor vessel 100. In use, the vacuum line 32 runs from the vacuum source into the reactor interior 108 and is mounted to the robotic device 10.1 along the cleaning arm 18 and extends through the body 12. The vacuum line 32 is threaded through the internal passage defined by roughly circular cylindrical frameworks or frame assemblies 48 of the segments 22, 26, 28 of the cleaning arm 18. Accordingly, the vacuum line 32 is partially enclosed by the framework 48 of the cleaning arm 18 and is therefore securely held in position by the cleaning arm 18. An inlet end of the vacuum line 32 is connected to a nozzle 36 which is integral to the framework of the cleaning arm 18. In this way, moving the cleaning arm 18 would move the vacuum line 32 in a corresponding fashion. By controlling the movement of the cleaning arm 18, an operator can control and direct the inlet end of the vacuum line 32 and thereby control the direction of its suction.

The insertion/removal of a length of the vacuum line 32 is facilitated by means of the vacuum line reel 34 as the first segment 22 of the cleaning arm 18 is telescopically adjusted.

The vacuum line 32 is constructed from a flexible material such as rubber or PVC with a flexible or accordion-like fabrication in order to allow for the vacuum line 32 to be bent as segments 26 and 28 are angled or angularly displaced relative to the generally vertical axis 30. The vacuum line 32 typically has a diameter of about 10 cm (4 inches).

Cameras 38, 40 are mounted to the operatively lower segments 26, 28 of the cleaning arm 18. The positioning of the cameras 38, 40 allows the operator to monitor multiple fields of vision during operation of the robotic device 10.1. A camera 38 is mounted to segment 28 proximate the nozzle 36 of the vacuum line 32. A camera 40 is also mounted on segment 26. In use, cameras 38, 40 are directed towards the catalyst material 106 to be vacuumed. Cameras 38, 40 are provided with built-in, adjustable lights to allow a focused view in dusty areas. A camera (not shown), mounted to the back of camera 40, is directed operatively upwardly in order to provide a view of first segment 22 and the reactor opening defined by the entry manway flange 104. This view will assist the operator during initial movement of the robotic device 10.1 underneath reactor trays (not shown) where catalyst beds are loaded to maximum capacity and to enable incident free movement through the reactor trays and in multibed reactors.

As operation commences, the segments 22, 26, 28 of the cleaning arm 18 would typically be aligned along the generally vertical axis 30. A vacuum breaker valve (not shown) will be opened to allow suction through the vacuum line 32 by means of the nozzle 36 to which the inlet end of the vacuum line 32 is connected. The cleaning arm can move or displace longitudinally in an operatively downward direction relative to the body 12 and/or segment 22 of the cleaning arm 18 can extend telescopically until the nozzle 36 is embedded in the catalyst material 106. Once sufficient catalyst material 106 has been removed by vacuum, the hinge joints 27, 29 can be adjusted independently to adjust the angles of segments 26, 28 relative to the vertical axis 30 in order for the nozzle 36 to reach catalyst material 106 which is distributed closer to the outer shell 102. The swivel joint 8 of the cleaning arm 18 is then rotated about the vertical axis 30 in a clockwise and/or anti-clockwise direction to remove a surface layer of catalyst material 106. Once a full 360 degree rotation cycle has been completed by the cleaning arm 18, the cleaning arm 18 can be further moved in an operatively downward direction relative to the body 12 and/or segment 22 of the cleaning arm 18 can be further extended telescopically to reach the remaining catalyst material 106 and to remove the next surface layer of catalyst material 106 in the same way described above. Once all the catalyst material 106 has been removed from the reactor interior 108, the vacuum breaker valve is closed and the hinge joints 27, 29 are adjusted independently to adjust the angles of segments 26, 28 to align with the vertical axis 30 in order for segments 22b, 26, 28 of the cleaning arm 18 to be safely raised or removed through the opening defined by the entry manway flange 104.

In order to facilitate telescopic extension/retraction of the extensions 24a, 24b, 24c and 24d of the first segment 22, the robotic device 10.1 includes a lifting cable 21 (see FIG. 3) which runs over the lifting cable reel 20 and has one end, which is secured to a drum of a winch 23 which is mounted toward a top of the cleaning arm 18, and an opposite end which is secured to the lowermost extension 24d of the first segment 22. The lifting cable 21 runs inside the framework 48 of the first segment 22. Accordingly, during retraction of the cleaning arm 18, as the lifting cable 21 is wound up, it pulls the lowermost extension 24d into the extension 24c until it has been fully retracted following which the extension 24c starts to retract into the extension 24b. The same applies in relation to extension 24b retracting into extension 24a. During extension of the cleaning arm 18, the telescopic extensions 24a, 24b, 24c, 24d extend under the influence of gravity as the lifting cable 21 is lengthened and lowered.

Loading Catalyst Material to the Interior of the Reactor

As mentioned before, by making changes to the configuration of the robotic device 10.1 described above, the robotic device 10.2 shown in FIGS. 5 to 9 is constructed. This embodiment of the robotic device 10.2 is configured to load catalyst material 206 into the interior 108 of the reactor vessel 100. The same reference numerals used above to refer to parts of the robotic device 10.1 have again been used below to refer to similar parts of the robotic device 10.2. For the sake of brevity, a description of similar parts will not be repeated below.

The robotic device 10.2 has the same body 12, the base plate 14 of which is received on the entry manway flange 104. The base plate 14 of the body 12 is therefore secured to the entry manway flange 104 using suitable fasteners in the same fashion as described with reference to the robotic device 10.1. The body 12 is therefore supported on the flange 104 of the reactor vessel 100. Furthermore, for the sake of clarity, it is repeated here that the body 12 includes the swivel joint 8 which is configured to rotate about the generally vertical axis 30 in a clockwise and/or anti-clockwise fashion.

Figure 5:
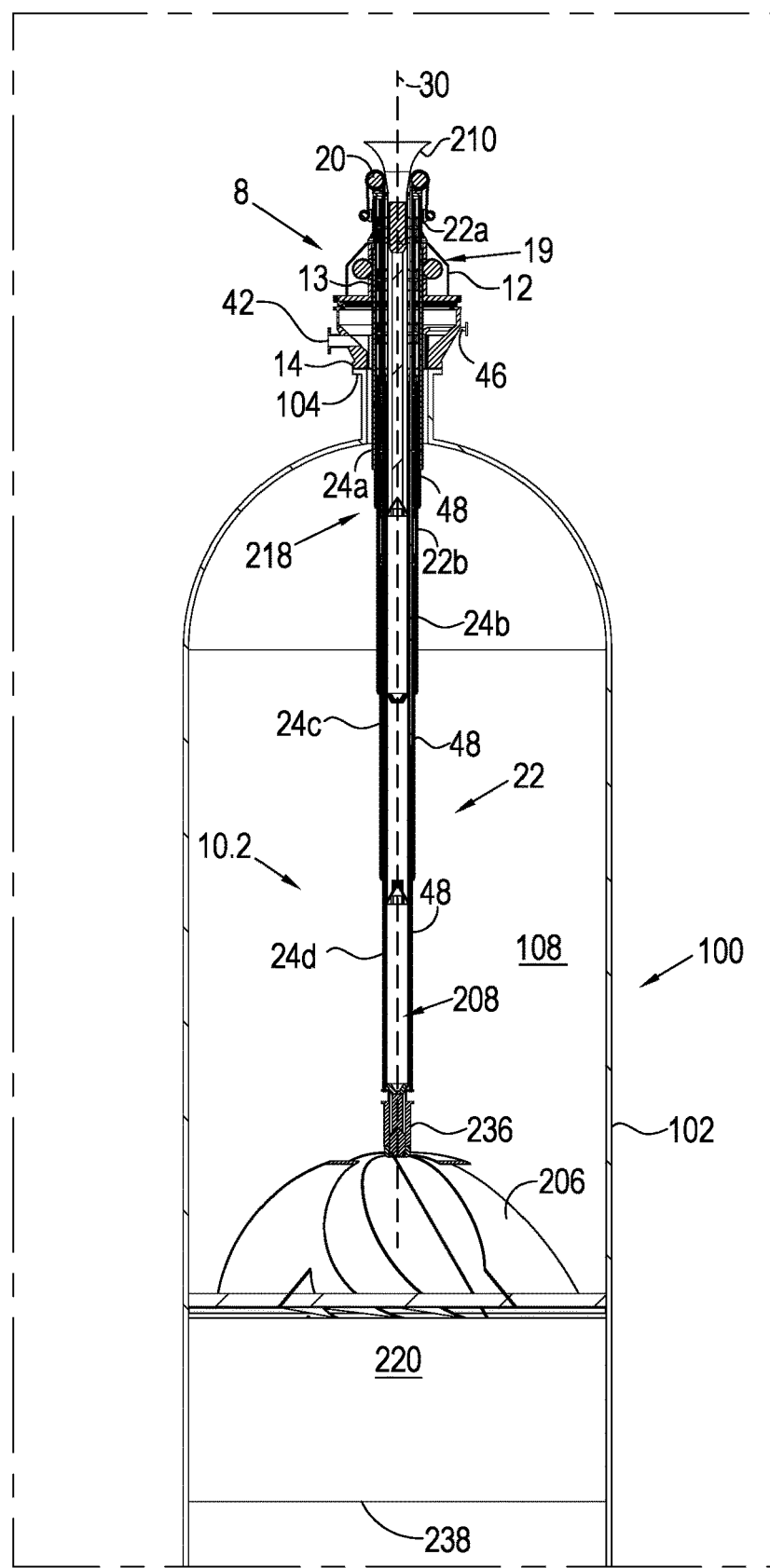
FIG. 5 shows a schematic vertical section of the robotic device in accordance with the invention used in a reactor for loading catalyst material to an interior of the reactor, in an extended condition, including a loading sleeve connected to the handling arm of the device to form the loading arm.
Figure 6:
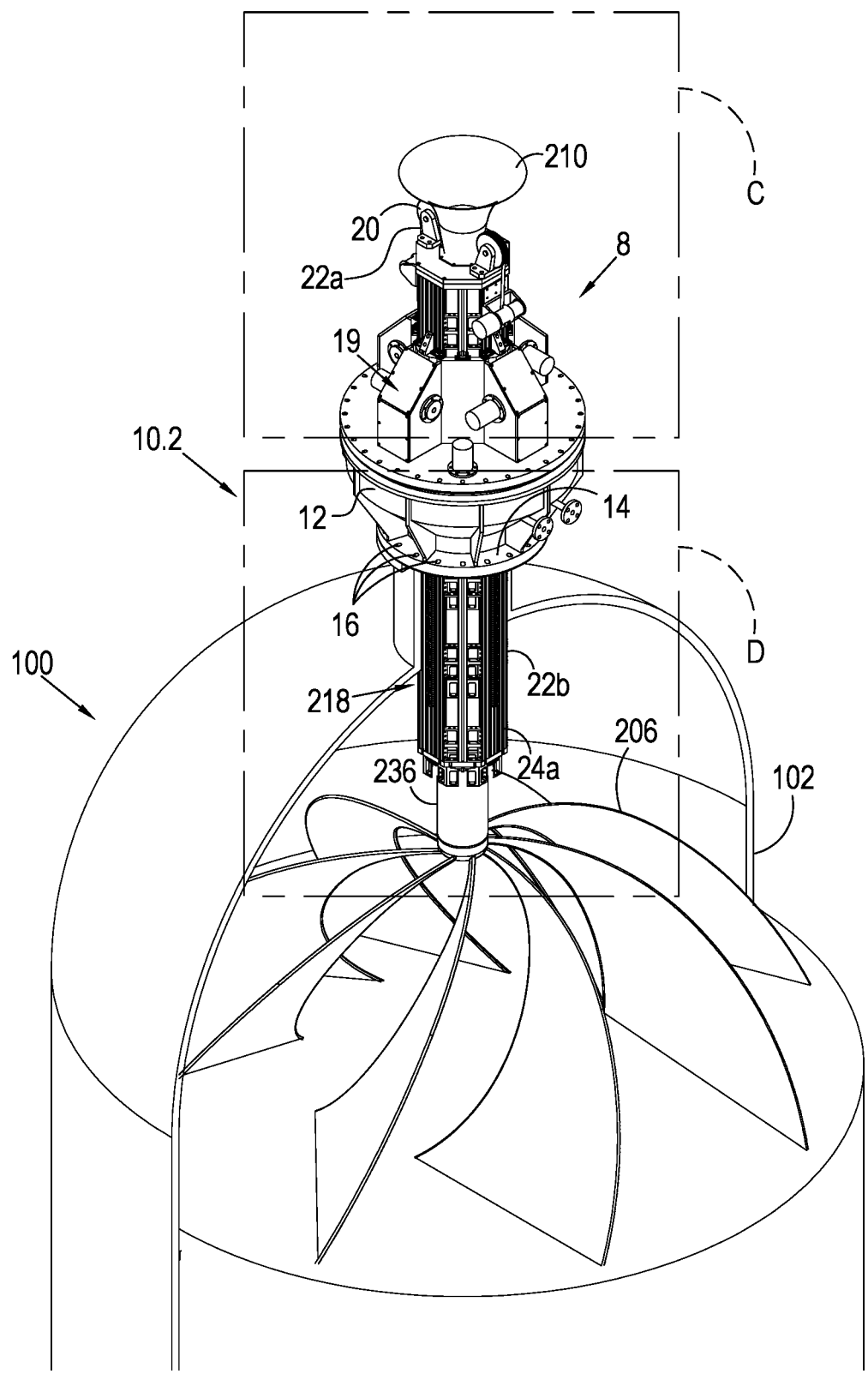
FIG. 6 shows a three-dimensional vertical section of the robotic device shown in FIG. 5, in a contracted condition.
Figure 7:
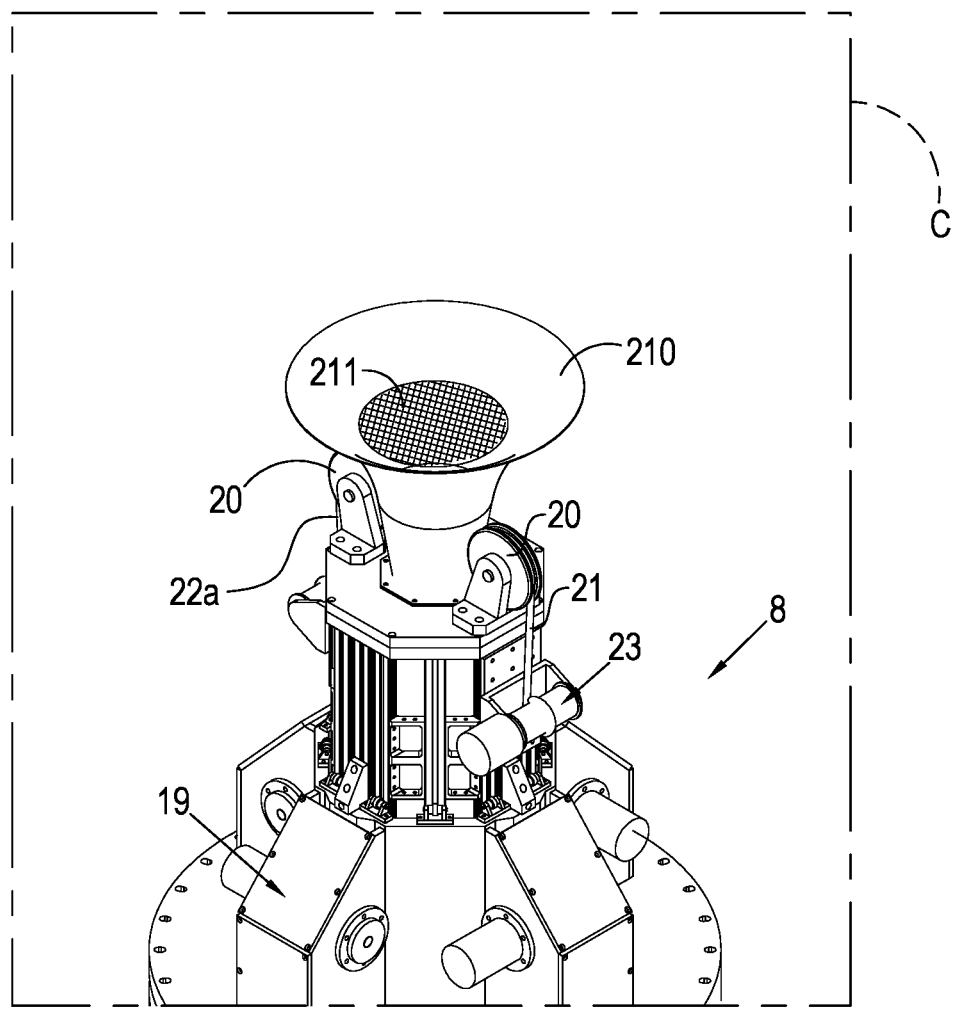
FIG. 7 shows an enlarged three-dimensional view of Detail C indicated in FIG. 6.
Figure 8:
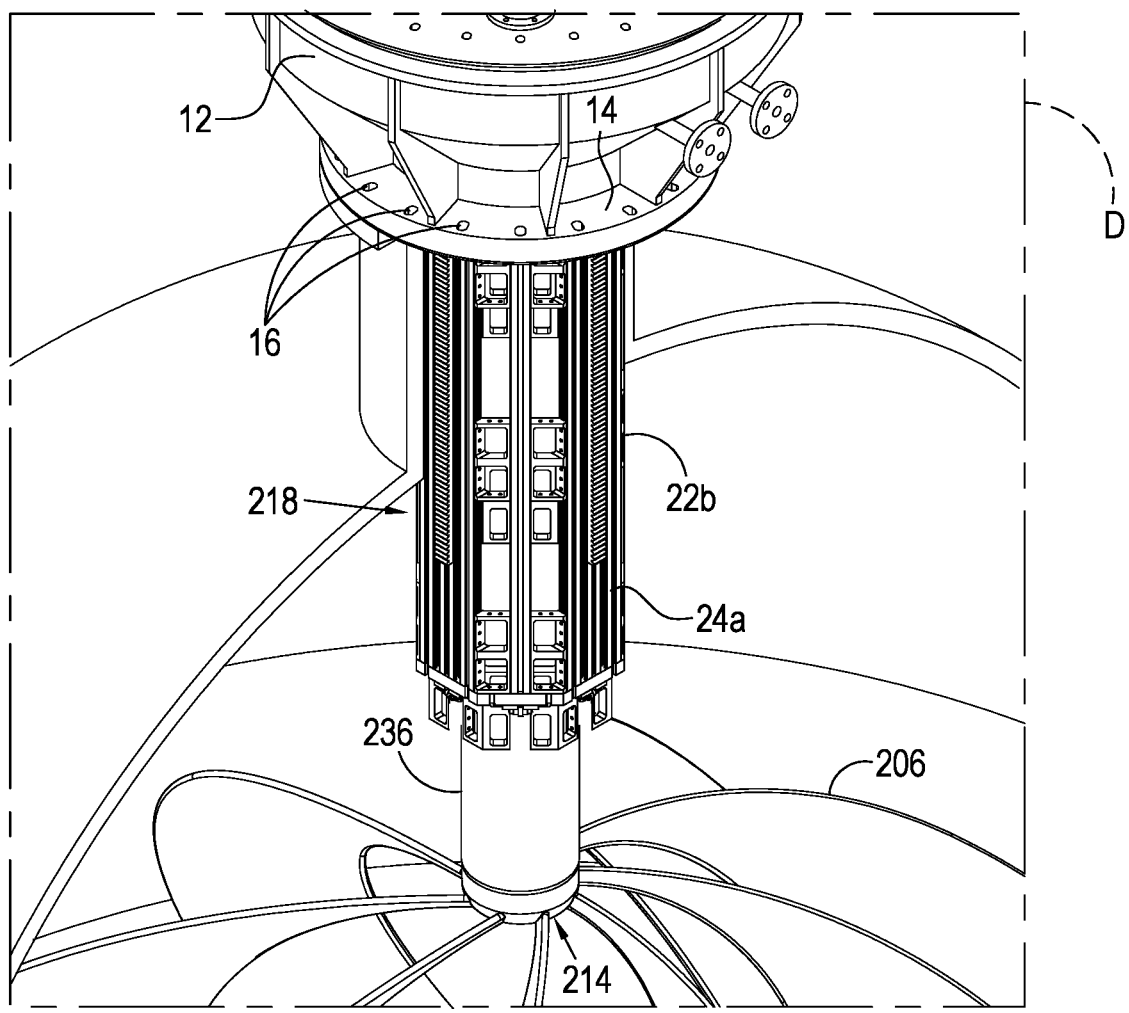
FIG. 8 shows an enlarged three-dimensional view of Detail D indicated in FIG. 6.
Figure 9:
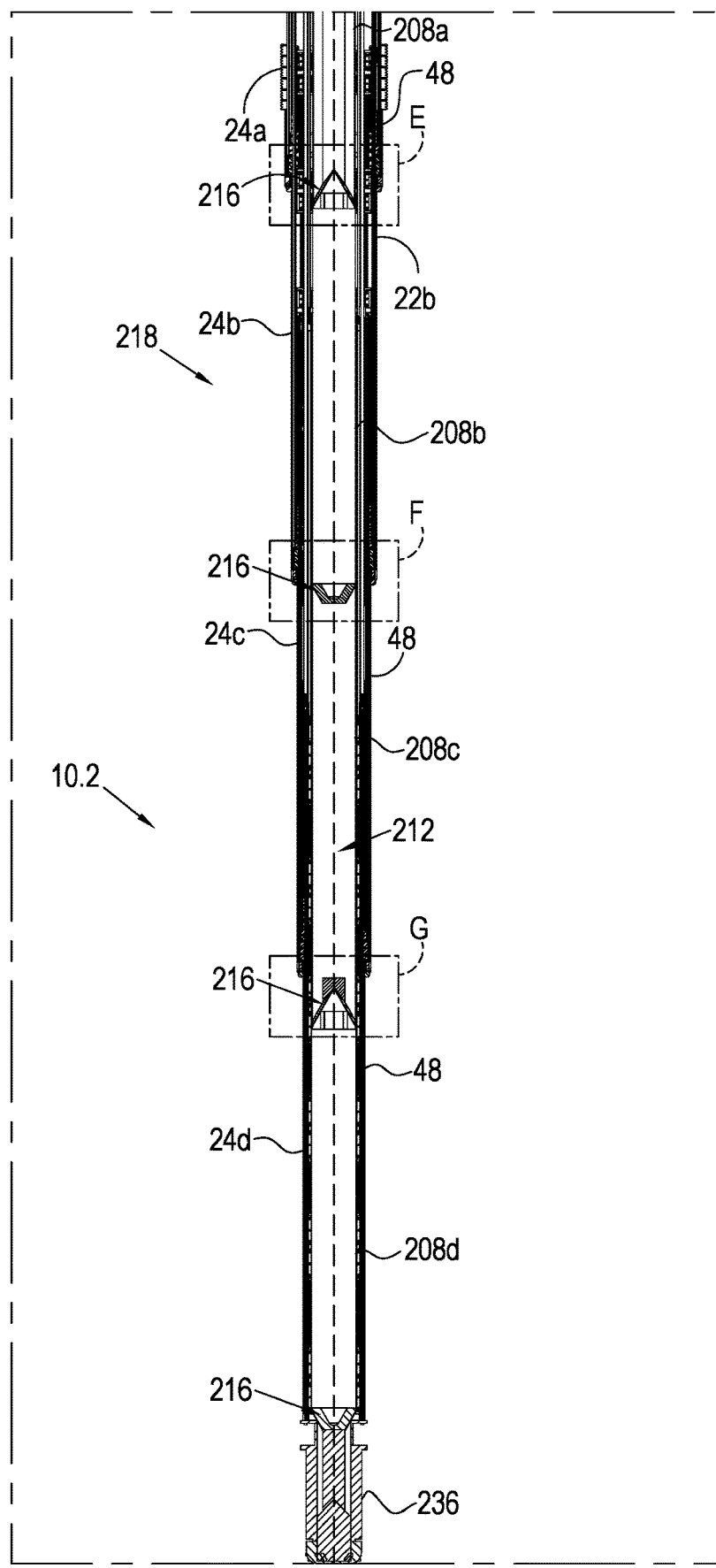
FIG. 9 shows a schematic vertical section of the internal passageway defined by the loading sleeve shown in FIG. 5.
Figure 10A:
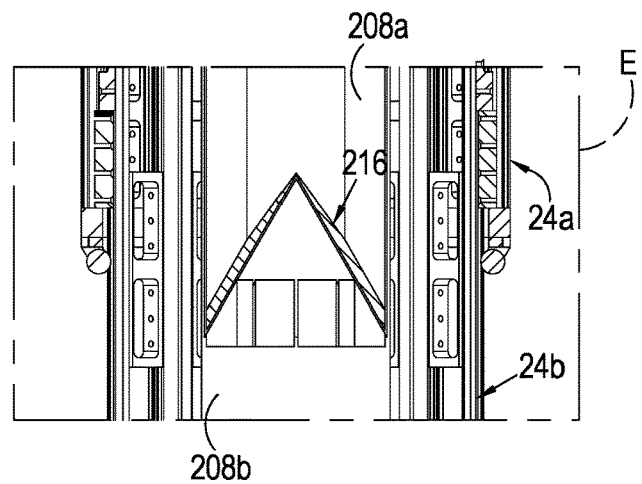
FIGS. 10A, 10B and 10C show enlarged views of Details E, F and G, respectively, as indicated in FIG. 9.
Figure 10B:
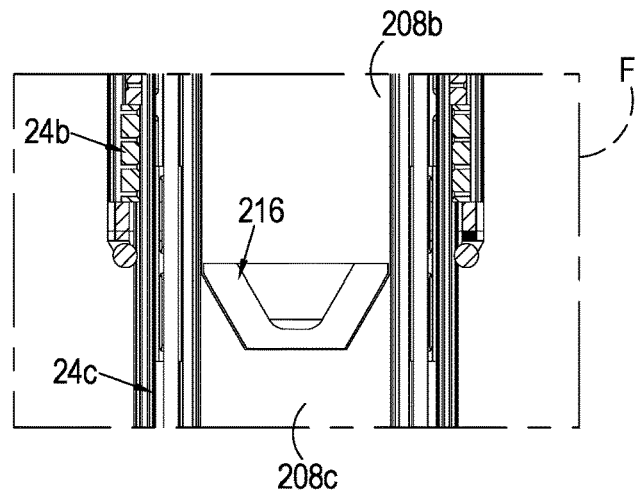
Figure 10C:
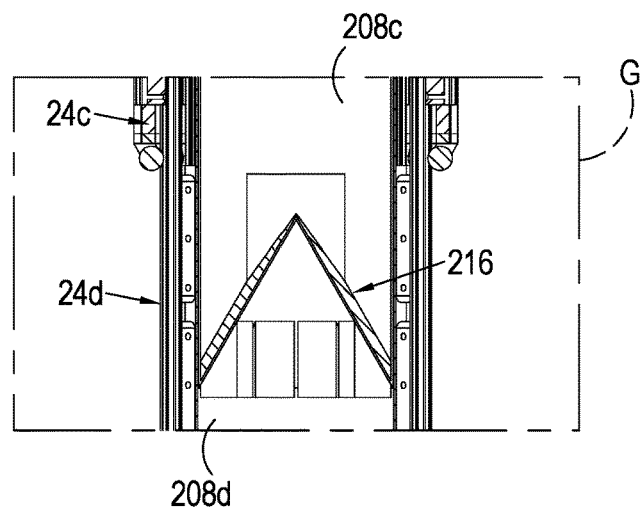

In this embodiment, the handling arm of the robotic device 10.2 is configured as a loading arm 218 (see FIGS. 5 to 9). This is achieved by connecting a multistage, telescopically extendable/retractable loading sleeve 208 internally to the framework 48 of the loading arm 218. Accordingly, the loading sleeve 208 is installed into the internal passageway or hollow defined by the framework 48 of the loading arm 218. In contrast to the robotic device 10.1, which has three segments 22, 26, 28, the loading arm 218 of the robotic device 10.2 comprises only a single multistage segment 22 which is telescopically extendible and retractable relative to the body 12, in similar fashion as described above with reference to the robotic device 10.1. As before, segment 22 of the loading arm 218 can extend and retract/contract in telescopic fashion. With reference to FIG. 5, segment 22 comprises four telescopic extensions or stages 24a, 24b, 24c, 24d. In FIG. 5, these extensions 24a, 24b, 24c, 24d are shown in a telescopically extended condition such that all four extensions 24a, 24b, 24c, 24d are visible. In FIGS. 6, the extensions 24a, 24b, 24c, 24d are in a contracted condition.

Therefore, in order to convert the robotic device 10.1 shown in FIGS. 1 to 4, having the cleaning arm 18, to the robotic device 10.2 shown in FIGS. 5 to 9, having the loading arm 218, the second and third segments 26 and 28 of the cleaning arm 18 are removed. In addition, the vacuum line 32, and ancillary equipment such as the vacuum reel 34 are also removed. Then the loading sleeve 208, comprising a plurality of telescopically extendable/retractable sections 208a, 208b, 208c, 208d (see FIGS. 9 and 10A, 10B, 10C), is threaded through the internal passageway of the framework 48 of the loading arm 218 and is internally secured to individual extensions 24a, 24b, 24c, 24d of the loading arm 218. The loading sleeve 208 is concentrically and telescopically received within the loading arm 218. However, telescopic action of the loading sleeve 208 is inside out when compared to that of the segment 22 of the loading arm 218. This is owing to the fact that an operatively upper end of each respective section 208a, 208b, 208c, 208d of the loading sleeve 208 is secured to the corresponding extension 24a, 24b, 24c, 24d of the multistage segment 22. The loading sleeve 208 therefore forms an internal passageway 212 for conveying the catalyst material 206. Furthermore, the loading sleeve 208 is accommodated on the inside of the framework 48 of the loading arm 218 which surrounds it. A loading device or revolving material distributor 236 is secured to a distal or free end of the framework 48 of the lowermost extension 24d of the loading arm 218, in fluid flow communication with the lowermost section 208d of the loading sleeve 208.

The catalyst material 206 is fed from a catalyst loading hopper (not shown), which is secured to a structure (not shown) above the reactor vessel 100, to the reactor interior 108 via the internal passageway 212 of the loading sleeve 208. To this end, an upstream cone-shaped inlet 210 is secured over a mouth of the internal passageway 212 defined by the uppermost section 208a of the loading sleeve 208. Accordingly, the cone-shaped inlet 210 leads into the loading sleeve 208 below and is configured to receive the catalyst material 206 from the loading hopper (not shown) above via a flexible sock (not shown). The inlet 210 is covered by a mesh or grid 211 (see FIG. 7) to prevent debris and foreign objects from entering the loading sleeve 208.

In the same manner as the cleaning arm 18, the loading arm 218 is longitudinally displaceable relative to the body 12 in an operational upward or downward direction by way of the multiple motor-driven rack and pinion arrangements 19. In rotating the swivel joint 8 of the body 12, the loading arm 218, which is connected to the swivel joint 8 via the rack and pinion arrangements 19, is propelled to rotate in a horizontal plane about the generally vertical axis 30.

In order to facilitate telescopic extension/retraction of the extensions 24a, 24b, 24c and 24d of the segment 22 as well as the sections 208a, 208b, 208c, 208d of the loading sleeve 208, the robotic device 10.2 includes the lifting cable 21 (see FIG. 7) which runs over the lifting cable reel 20. Two lifting cables 21 and lifting cable reels 20 are provided, one on either side of the inlet 210. One end of each lifting cable 21 is secured to a drum of a winch 23 which is mounted toward a top of the uppermost extension 24a of the segment 22 of the loading arm 18, and an opposite end is secured to the lowermost extension 24d of the segment 22. The lifting cable 21 runs inside the framework 48 of the segment 22. Accordingly, during retraction of the loading arm 218, as the lifting cables 21 are wound up by the winches 23, they pull the lowermost extension 24d into the extension 24c until it has been fully retracted. At the same time, the lowermost section 208d slides over the section 208c. Upon continued winding of the lifting cable 21, the extension 24c starts to retract into the extension 24b. At this time, the section 208c slides over the section 208b of the loading sleeve 208. Hence, the telescopic action of the loading sleeve 208 is simultaneous and inside out when compared to that of the segment 22 of the loading arm 218. The same applies in relation to extension 24b retracting into extension 24a etcetera. During extension of the loading arm 18, the telescopic extensions 24a, 24b, 24c, 24d, and corresponding sections 208a, 208b, 208c, 208d of the loading sleeve 208 extend under the influence of gravity as the lifting cables 21 are unwound from the winches 23 and lowered.

As with the robotic device 10.1, the robotic device 10.2 is connected to the remote control station by means of cables, including power supply cables and video camera cables. In order to distribute the catalyst material received into the loading device 236 via the internal passageway 212 of the loading sleeve 208, the loading device 236 is angularly displaced or rotated about the vertical axis 30 which results in the catalyst material 206 being propelled or spread radially outward from outlets 214 of the loading device 236 owing to centrifugal action induced by rotation of the loading device 236. Accordingly, rotation of the loading device 236, which serves the purpose of evenly spreading or distributing the catalyst material 206 inside the reactor vessel 100, may be remotely controlled by the operator.

As can be seen in FIGS. 9, 10A, 10B, and 10C, the loading sleeve 208 has multistage internal flow restriction along the internal passageway 212 between the inlet 210 and the outlet 214. To this end, an operatively lower end of each section 208a, 208b, 208c, 208d of the loading sleeve 208 includes a conical flow restriction 216 which serves to impede the flow of catalyst material 206 through the internal passageway 212. As can be seen in the Figures, the conical flow restrictions 216 alternate between a depending cone (see FIG. 10B) and an inverted or upwardly orientated cone (see FIGS. 10A and 10C). These restrictions 216 break the fall of catalyst material from the inlet 210 to the outlet 214 and thus prevent structural damage to the catalyst material 206. The flow restrictions 216 also create cavities or breaks the flow of catalyst material inside the internal passageway 212 which facilitates easier retraction of the loading arm 218 and loading sleeve 208. This is because an entire column of catalyst material 206 extending from inlet 210 to outlet 214 would hamper retraction of the individual sections 208a, 208b, 208c, 208d.

A camera (not shown) can be mounted to segment 24d. The positioning of this camera allows the operator to monitor the level of the catalyst bed during the loading process.

As the loading process commences, telescopic extensions 24a, 24b, 24c, 24d of segment 22 of the loading arm 218 and the sections of the loading sleeve 208 will be extended to ensure that the outlet 214 of the loading sleeve 208 is proximate an internal floor 238 of the reactor, preferably about 1 meter from the floor 238 of the reactor 100, even more preferably less than 1 meter from the floor 238 of the reactor 100. As the level of the catalyst bed 220 rises, the extensions 24a, 24b, 24c, 24d of segment 22 of the loading arm 218 and the sections 208a, 208b, 208c, 208d of the loading sleeve 208, starting with the lowermost extension 24d and lowermost section 208d, is telescopically retracted to ensure that the outlet 214 of the loading device 236 remains within an acceptable distance of the catalyst bed 220 level, typically within 1 meter.

The loading arm 218 of the robotic device 10.2 is rotatable about the vertical axis 30, longitudinally displaceable relative to the body 12 and is telescopically extendable/ retractable inside the reactor vessel 100 and is operated remotely by the operator from the remote control station (not shown) situated away from the reactor vessel 100. In this way, the need for the operator to enter the reactor interior 108 is obviated. The remote control station is connected to the robotic device by means of cables (not shown). The remote control station has one or more monitors for viewing images from video camera (not shown) proximate a free, distal end of the loading arm 218 and is provided with controls to extend, retract and rotate the loading arm 218 inside the reactor vessel 100.

In order to maintain inert conditions inside the reactor 100, the robotic device 10.1, 10.2 shown in FIGS. 1 to 10 is configured to purge the interior of the reactor 108 using an inert gas. In accordance with conventional methods, nitrogen ($N_2$) gas is used to create and to maintain a positive inert atmosphere by continuously purging the reactor 100 with a $N_2$ gas to prevent any oxygen ($O_2$) from entering the interior of the reactor 108, and to maintain an atmosphere where the $O_2$ concentration remains below a certain threshold, typically at or below 2 volume/volume %. The $N_2$ gas may act as a barrier over the catalyst material 106, 206 and may displace air or hydrocarbons that may be trapped or accumulated in the interior of the reactor 108 which may cause an explosion or fire.

The robotic device 10 is configured to accommodate the abovementioned method of creating and maintaining a positive inert atmosphere in the interior of the reactor 108. In particular, the body 12 is provided with three different inlet/outlet points or ports 42, 44, 46. These inlet/outlet points are discussed below. In addition, dust may be extracted from the interior of the reactor via one of the ports.

An $N_2$ gas return line inlet 42 is provided on the body 12 to re-direct any of the $N_2$ gas which has been removed from the interior of the reactor 108, either during the vacuuming process or during the loading process, back into the interior 108 of the reactor 100. During the removal process, the vacuumed product, comprising $N_2$ gas and catalyst material 106, which is removed during the vacuuming process is passed through a solid gas separation stage (not shown), such as a cyclone hopper, to substantially separate the catalyst material 106 and the $N_2$ gas. The $N_2$ gas which has been substantially separated from the catalyst material 106, may be directed to the interior of the reactor 108 by means of the $N_2$ gas return line (not shown) connected to the $N_2$ gas return line inlet 42, thereby recycling at least a portion of the $N_2$ gas which was removed during the vacuuming process. The $N_2$ gas return line may have a diameter of about 10 cm (about 4 inches).

A fresh $N_2$ inlet 44 may be provided on the body 12 which is connected to a $N_2$ source (not shown) by means of a fresh $N_2$ line (not shown). In particular, the fresh $N_2$ line connecting the fresh $N_2$ inlet 44 and the $N_2$ source may have a diameter of about 2.5 cm (about 1 inch). This fresh $N_2$ line enters the fresh $N_2$ inlet 44 and has an approximate 90 degree bend in order to direct the fresh $N_2$ to the interior of the reactor 108. The fresh $N_2$ inlet line may be connected to a flange comprising a shut-off valve and a pressure gauge (not shown). The $N_2$ source may include Refinery $N_2$ stock, $N_2$ from an evaporator plant or portable $N_2$ cylinder banks, in order to introduce additional heated or cooled $N_2$ to the top of the reactor 100 when difficult vacuum tasks occur, e.g. where catalyst material 106 is crusty or sticky. Introducing additional fresh $N_2$ to the top of the reactor 100 forms an inert barrier or blanket over the catalyst material 106. It is common practice to vent excess $N_2$ out the top of the reactor 100 as this is an indication that the reactor is under positive pressure which will prevent $O_2$ from entering the reactor.

A pressure relief valve (PRV) connection point 46 is provided on the body 12. The PRV specification will be in accordance with the reactor's shell pressure requirement and will be fitted with a replaceable rupture disc inside a sealed housing. In the event that the reactor pressure increases beyond or below the PRV parameters, the rupture disc will fail and relieve pressure on the reactor shell 102 which could otherwise cause damage to the plant equipment and cause expensive delays.

All movements and operation can be controlled from a BRM (blast resistant module) control unit (not shown) by a trained and certified operator. From the BRM unit a cable harness will be connected to a top connection panel of the robotic device 10. The BRM unit will be equipped with two monitors (not shown) in order to continuously view the footage of cameras 38, 40 mounted to the cleaning arm 18.

The body 12 can be rotated through 360 degrees both in a clockwise and an anti-clockwise direction by way of two 110V EX rated high torque, slow drive electric motors situated on the top of the body circling around the ring gear mounted to the base plate 14.

Longitudinal movement of the cleaning arm 18 relative to the body 12 is achieved by four 110V EX rated high torque, slow drive electric motors situated across from each other on top of the body 12. These motors form parts of the rack and pinion arrangements 19.

Telescopic extension and contraction/retraction of extensions 24a, 24b, 24c, 24d of segment 22 of the cleaning arm 18 or the loading arm 218 is achieved by an 110V EX rated high torque, slow drive electric winch motors with reliable load tested cables 21 anchored to the top of extension 24d to allow telescopic extraction or contraction/retraction of extensions 24a, 24b, 24c, 24d.

The Applicant believes that the robotic device 10.1, 10.2 in accordance with the invention provides a solution to obviate the need for an operator to enter into the reactor interior 108 during the catalyst removal or loading process which significantly reduces the risk of operator death or injury. Furthermore, it provides a single solution for both loading and removal of catalyst material with only minor adjustments having to be made to the robotic device to switch between the two purposes. Also, the ability of the cleaning arm 18 of the robotic device 10.1 to move longitudinally relative to the body 12, telescopically extend/retract, and the pivotal displacement of the articulated segments of the cleaning arm 18 ensure that it can reach the catalyst material 106 distributed in all areas inside the reactor 108 during catalyst removal without an operator having to enter the reactor 100. In addition, the ability of the loading arm 218 of the robotic device 10.2 to move longitudinally relative to the body 12, to telescopically extend/retract and to receive a conventional loading device 236 ensures even and dense packing of the catalyst without the need of an operator to enter the interior 108 of the reactor 100. It also simplifies dense loading because it obviates the need of the operator continually to monitor and adjust angular velocity of a conventional, fixed dense loader as the level of the catalyst bed inside the reactor rises. Dust can also be extracted from the interior whilst the interior is purged with an inert gas to maintain safe operating conditions. Another advantage of not having an operator inside the reactor is that the catalyst is not damaged by the operator trampling upon it.

The invention claimed is:

1. A robotic device for handling catalyst material in an interior of a reactor, wherein the robotic device comprises:
a body configured to engage a flange of the reactor, wherein an inner edge of the flange defines an opening in the reactor; and
a handling arm connected to the body and having a free end, the handling arm comprising at least one segment which is telescopically extendible/retractable relative to the body, wherein at least a part of the handling arm including the free end is configured to extend through the opening in the reactor into the interior of the reactor, and wherein the handling arm is configured to receive or connect to a vacuum line to form a cleaning arm for removing catalyst material from the interior of the reactor such that the free end of the handling arm and an inlet end of the vacuum line are proximate each other; and
wherein the body includes a base plate which is configured to engage the flange of the reactor and a head which is articulated to the base plate for rotation relative to the base plate about a rotation axis; wherein the handling arm is in the form of a multistage telescopic handling arm which comprises a frame assembly which defines a central passageway along its length which is configured to receive or connect to the vacuum line to form the cleaning arm, and wherein the head of the body defines a longitudinally extending receiving channel therein, the handling arm being connected to the head of the body and being longitudinally displaceable relative to the head of the body within the receiving channel.

2. The robotic device according to claim 1, wherein the base plate of the body is provided with a plurality of holes therethrough, positioning of the holes corresponding with or being in register with holes provided through the flange of the reactor such that the base plate of the body can be secured to the flange by means of fasteners; and wherein the head of the body is configured to rotate about the rotation axis passing through the body, whereby the rotation of the head of the body propels the handling arm connected to the head to rotate in a horizontal plane about the generally vertical rotation axis.

3. The robotic device according to claim 2, wherein the handling arm takes the form of a multi-segmented, articulated cleaning arm which includes a first, multistage telescopic segment which is displaceably connected to the head of the body and which is removably connected by way of a pivot joint to a second segment which, in turn, is removably connected by way of another pivot joint to a third segment.

4. The robotic device as claimed in claim 3, wherein the head of the body is connected to the base plate by way of a swivel joint such that the head is angularly displaceable relative to the base plate about the rotation axis.

5. The robotic device as claimed in claim 1, wherein the multistage telescopic handling arm includes a segment which comprises a plurality of interconnected extensions which are telescopically extendable/retractable relative to one another.

6. The robotic device as claimed in claim 5, wherein telescopic displacement of the multistage telescopic handling arm is achieved by means of a winch system, wherein a winch cable is secured to an innermost telescopic extension of the segment such that telescopic extension of the extensions is achieved by winding down or out the winch cable, which allows the extensions to be lowered into the interior of the reactor under the pull of gravity, and telescopic retraction is achieved by raising the innermost telescopic extension by winding up the winch cable.

7. The robotic device according to claim 1, wherein the handling arm is configured as a loading arm by connecting a telescopically extendable/retractable loading sleeve to individual telescopic extensions of the telescopic segment of the handling arm to form the loading arm for loading catalyst material into the interior of the reactor, the free end of the handling arm and an outlet of the loading sleeve being proximate each other.

8. The robotic device according to claim 7, wherein the loading sleeve includes telescopically extendable/retractable sections each of which is internally secured to an individual corresponding extension of the segment of the loading arm such that the loading sleeve is concentrically received within the segment of the loading arm, and such that the loading sleeve is telescopically displaceable, in inside out fashion relative to the segment, in unison within the segment of the loading arm; and wherein a revolving material distributor is secured to the free end of the loading arm, in fluid flow communication with a lowermost section of the loading sleeve.

9. The robotic device as claimed in claim 8, wherein an operatively upper end of each respective section of the loading sleeve is secured to the corresponding extension of the segment of the loading arm, the loading sleeve therefore forming an internal passageway for conveying the catalyst material from an inlet to the revolving material distributor.

10. The robotic device according to claim 9, wherein an operatively lower end of each section of the loading sleeve includes a flow restriction which serves to impede the flow of catalyst material through the internal passageway such that the loading sleeve has multistage internal flow restriction along the internal passageway between the inlet and the revolving material distributor.

11. The robotic device as claimed in claim 10, wherein the flow restrictions are conical and alternate between a depending cone and an inverted or upwardly orientated cone.

12. The robotic device as claimed in claim 1, which is remotely controlled by an operator from a remote control station and includes at least one camera which is mounted to the handling arm for feeding video footage to the remote control station.

13. The robotic device according to claim 1, wherein the handling arm is longitudinally displaceable relative to the body in an operational upward or downward direction by way of multiple motor-driven rack and pinion arrangements.

14. A method for removing catalyst material from an interior of a reactor using the robotic device as claimed in claim 1, comprising:
connecting the vacuum line to the handling arm of the robotic device to form the cleaning arm;
connecting a second and a third segment to the cleaning arm such that the second segment articulates with the at least one segment and the third segment articulates with the second segment;
positioning the robotic device on the flange of the reactor such that at least part of the cleaning arm including the free end extend through the opening in the reactor into the interior of the reactor;
securing the body of the robotic device to the flange of the reactor by means of fasteners such that stabilizing arms, to grip an inner surface of the reactor during use of the robotic device, are not necessary; and removing the catalyst material by vacuum from the interior of the reactor by telescopically extending the cleaning arm of the robotic device by way of remote control.

15. A method for loading catalyst material to an interior of a reactor using the robotic device as claimed in claim 8, comprising:

connecting the loading sleeve to the segment of the handling arm of the robotic device to form the loading arm;

connecting a revolving material distributor to the free end of the loading arm;

positioning the robotic device on the flange of the reactor such that at least part of the loading arm including the revolving material distributor extend through the opening in the reactor into the interior of the reactor;

securing the body of the robotic device to the flange of the reactor by means of fasteners such that stabilizing arms, to grip an inner surface of the reactor during use of the robotic device, are not necessary; and loading the catalyst material using the robotic device by directing flow of catalyst material through the loading sleeve and progressively telescopically retracting the loading arm as a level of catalyst inside the reactor rises.

* * * * *